Sept. 13, 1949.   W. L. WHARTON   2,482,046
SPRING WHEEL
Filed Oct. 29, 1947
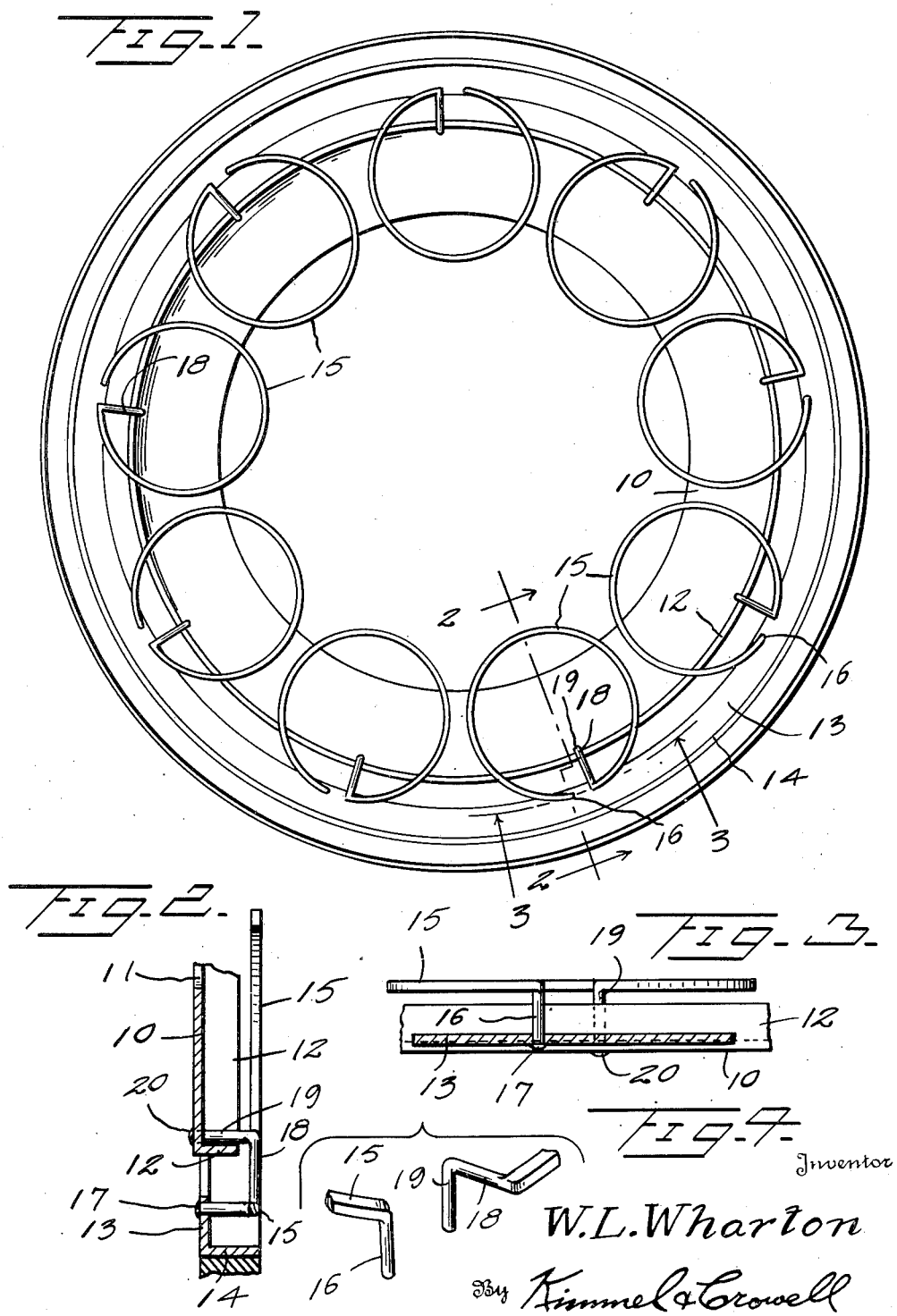
Inventor
W. L. Wharton
By Kimmel & Crowell
Attorneys Patented Sept. 13, 1949

2,482,046

UNITED STATES PATENT OFFICE 2,482,046

SPRING WHEEL

Walter Lee Wharton, San Angelo, Tex.

Application October 29, 1947, Serial No. 782,915

1 Claim. (Cl. 152—80)

This invention relates to vehicle wheels.

An object of this invention is to provide a vehicle wheel which includes an outer rim part, an inner hub part, and a spring connecting means between the rim and hub parts which will take up the shocks on the rim part and will resiliently hold the latter concentric to the hub part.

Another object of this invention is to provide a resilient vehicle wheel in which the hub and rim are connected together by means of substantially circular springs which will resist movement of the rim and hub in any direction so as to thereby resiliently maintain the parts in substantially concentric relation.

With the above and other objects in view, my invention consists in the arrangement, combination and details of construction disclosed in the drawings and specification, and then more particularly pointed out in the appended claim.

In the drawing,

Figure 1 is a detail side elevation of a vehicle wheel constructed according to an embodiment of this invention, Figure 2 is a fragmentary sectional view taken on the line 2—2 of Figure 1, Figure 3 is a fragmentary sectional view taken on the line 3—3 of Figure 1, Figure 4 is a fragmentary exploded perspective view of the ends of one of the split springs.

Referring to the drawing, the numeral 10 designates generally a circular plate forming the hub or body of the wheel, and in the present instance the plate 10 is provided with a central opening 11.

The plate or hub 10 is formed at its outer margin with an inwardly projecting annular flange 12, the purpose for which will be hereinafter described. An outer rim forming member 13 is disposed concentrically about the inner plate 10, and is formed at its outer margin with a cylindrical flange 14.

In order to provide a means whereby the outer rim member 13, including the flange 14, may be resiliently maintained substantially concentric with the inner plate 10, I have provided a plurality of split rings 15. There may be as many of these rings 15 as may be desired, and each ring includes a right angular arm 16 formed integrally with one end of the ring and anchored, as indicated at 17, to the rim member 13. The other end of each ring is formed with a radially disposed arm 18 which extends radially inwardly and a right angular outwardly projecting arm 19 is formed integral with the radial arm 18 and is anchored as at 20, to the plate 10 on the inner side of the annular flange 12. This flange 12 will provide a means whereby the arm 19 will be braced when strain is applied in a downward direction, as viewed in Figure 2, on the spring 15.

It will be understood that the flange 14 will have secured thereto a tire rim (not shown) for holding a conventional tire. With a spring wheel construction as hereinbefore described, the outer wheel part will be resiliently held against lateral and radial movement, and each wheel will provide a resilient suspension means for the associated portion of the vehicle.

I do not mean to confine myself to the exact details of construction herein disclosed, but claim all variations falling within the purview of the appended claim.

What I claim is:

A resilient wheel comprising concentric inner and outer annular members, a cylindrical flange carried by the outer edge of each member, and a plurality of circumferentially spaced apart annular split rings fixed at their free ends to said members, one end of each spring being formed with an L-shaped extension having one side thereof substantially radial to said ring and projecting inwardly, the other side of said extension being disposed on the inner side of the flange of said inner member and secured to the latter and an outwardly extending arm on the other end of each ring fixed to the other of said annular members.

WALTER LEE WHARTON.

REFERENCES CITED

The following references are of record in the file of this patent:

UNITED STATES PATENTS

| Number | Name | Date |
|---|---|---|
| 784,397 | Halle | Mar. 7, 1905 |
| 1,034,524 | Sjogren | Aug. 6, 1912 |